No. 674,192.                                                    Patented May 14, 1901.
S. H. BOLLING.
DRAINING DEVICE.
(Application filed June 30, 1899. Renewed Feb. 27, 1901.)
(No Model.)
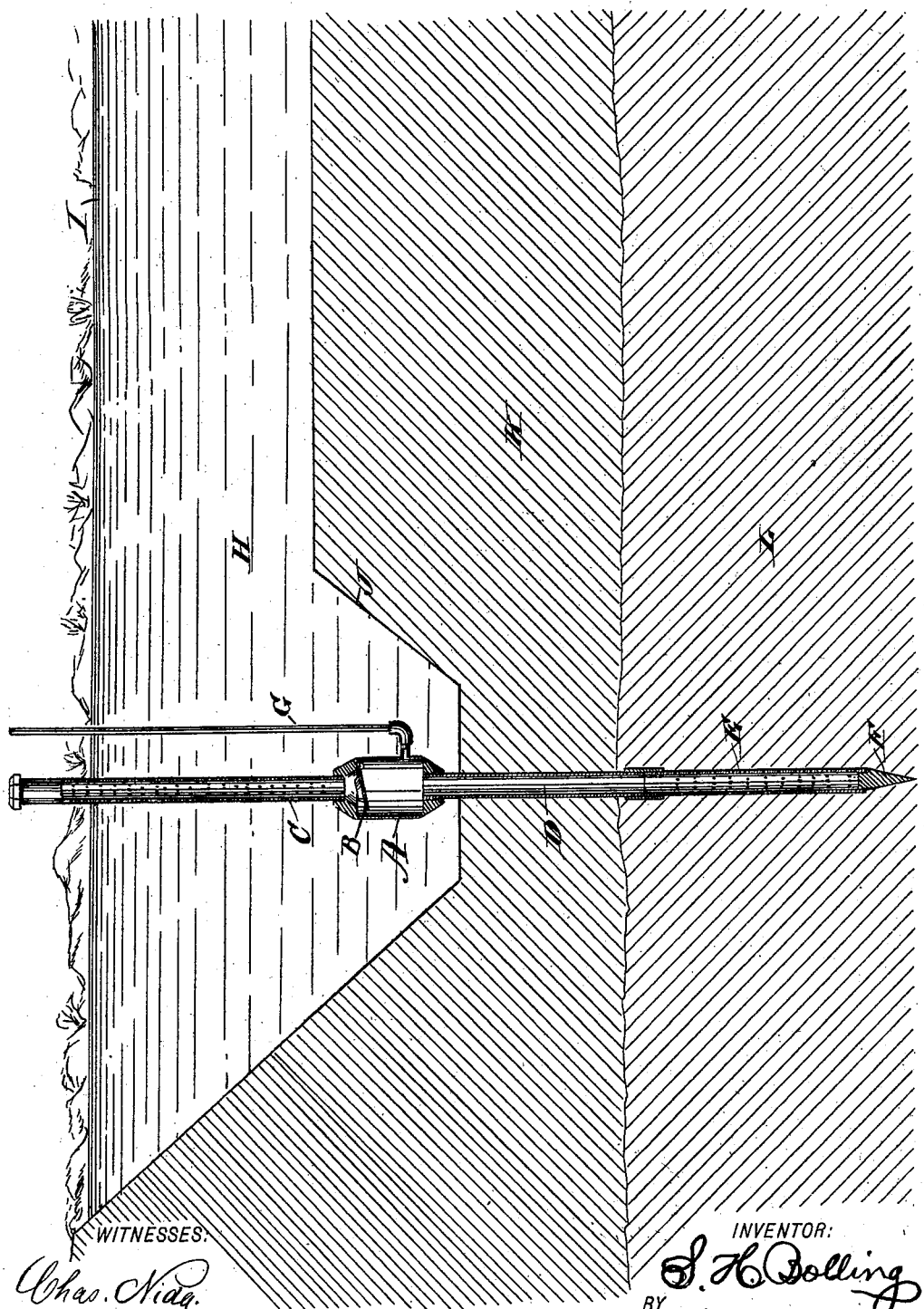
WITNESSES:
INVENTOR:
BY
ATTORNEYS.

UNITED STATES PATENT OFFICE.

SAMUEL HARVEY BOLLING, OF ITTABENA, MISSISSIPPI, ASSIGNOR OF ONE-HALF TO RICHARD A. BOLLING AND LUCY R. BOLLING, OF CENTERVILLE, MISSISSIPPI.

DRAINING DEVICE.

SPECIFICATION forming part of Letters Patent No. 674,192, dated May 14, 1901.

Application filed June 30, 1899. Renewed February 27, 1901. Serial No. 49,155. (No model.)

*To all whom it may concern:*

Be it known that I, SAMUEL HARVEY BOLLING, of Ittabena, in the county of Leflore and State of Mississippi, have invented a new and Improved Draining Device, of which the following is a full, clear, and exact description.

The object of the invention is to provide a new and improved device which is simple and durable in construction and more especially designed for conveniently and quickly removing surface water—such as ponds, ditches, lakes, and the like—to a lower stratum.

The invention consists of a box provided with a perforated inlet-pipe, a like outlet-pipe, and an air-pipe.

The invention also consists of certain parts and details and combinations of the same, as will be hereinafter described, and then pointed out in the claims.

Reference is to be had to the accompanying drawing, forming a part of this specification, in which the figure is a sectional side elevation of the improvement as applied.

The improved draining device is provided with a box A of suitable shape and dimensions and containing in its upper end a downwardly-opening valve B, leading into a vertically-extending pipe C, formed with perforations and preferably closed at the top. From the bottom of the box A extends downwardly the main pipe D, supporting at its lower end a perforated pipe E, formed with and carrying on its bottom a point F for conveniently driving the main pipe into the ground. From the box A extends upwardly an air-pipe G, arranged parallel to the perforated pipe C.

The device is used as follows: A channel H is formed from the lake, pond, or ditch I, and in this channel is arranged a cavity J, extending below the bottom of the lake, pond, or ditch I to be drained. The apparatus is then driven through the stratum K, located below the bottom of the pond, ditch, or lake I and impervious to water, until the box A extends into the excavation J, as plainly shown in the drawing. By thus driving the apparatus into the ground the point F of the pipe E passes through the impervious stratum K and enters the porous stratum L, as shown in the drawing, the main pipe D being of a sufficient length to extend through the thickness or depth of the impervious stratum K. Now the water from the lake, pond, or ditch I passes into the channel H and drains through the perforated pipe C and past the valve B into the box A, from which it flows down the main pipe D into the perforated pipe E and out through the perforations of the same into the porous stratum L. The air entering the box A, with the water A coming from the pipe C, can readily escape through the pipe G, which latter also permits the water to readily flow downward through the main pipe D into the perforated pipe E, as above described. The valve B regulates the flow of water from pipe C into box A, that otherwise would so fill box A as to stop the escape of air through pipe G, and thus prevent the downward flow of water through pipe D. The pipe C is formed with perforations, so that it will readily admit the water, but will keep out trash and other matter, which if allowed to enter would in time clog the entire drainage-pipe. Thus it will be seen that by this simple device the surface water from a lake, pond, or ditch can be readily removed to a lower porous stratum which readily takes up the water and distributes the same in the usual manner.

Having thus fully described my invention, I claim as new and desire to secure by Letters Patent—

1. A draining device comprising a box, a perforated inlet-pipe extending upwardly from the said box, a main pipe extending downwardly from the said box and formed with a perforated extension, and an air-pipe leading upwardly from the said box, substantially as shown and described.

2. A draining device comprising a box, a perforated inlet-pipe extending upwardly from the said box, a main pipe extending downwardly from the said box and formed with a perforated extension, an air-pipe leading upwardly from the said box, and a valve held in the said box and adapted to close the lower end of the perforated inlet-pipe, substantially as shown and described.

3. A draining device comprising a box, a perforated inlet-pipe extending upwardly from the said box, a main pipe extending downwardly from the said box, and formed with a perforated extension, an air-pipe leading upwardly from the said box, and a point arranged on the lower end of the perforated extension to conveniently drive the main pipe through the several strata, substantially as shown and described.

4. A draining device, comprising a main pipe or well extending downward to an open stratum having a constant water-level, an air-pipe leading from the main pipe, and a drain-pipe discharging into the upper end of said main pipe.

SAMUEL HARVEY BOLLING.

Witnesses:
F. P. THOMSON,
STEWART RICHARDSON.